United States Patent
Li et al.

(10) Patent No.: US 11,880,222 B2
(45) Date of Patent: Jan. 23, 2024

(54) METHOD, APPARATUS, AND DEVICE FOR ERASING SOLID STATE DISK, AND STORAGE MEDIUM

(71) Applicant: SUZHOU INSPUR INTELLIGENT TECHNOLOGY CO., LTD., Jiangsu (CN)

(72) Inventors: Hui Li, Jiangsu (CN); Bo Zhang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/013,157

(22) PCT Filed: Jan. 25, 2021

(86) PCT No.: PCT/CN2021/073471
§ 371 (c)(1),
(2) Date: Dec. 27, 2022

(87) PCT Pub. No.: WO2022/027936
PCT Pub. Date: Feb. 10, 2022

(65) Prior Publication Data
US 2023/0195326 A1     Jun. 22, 2023

(30) Foreign Application Priority Data

Aug. 7, 2020   (CN) .......................... 202010785946.9

(51) Int. Cl.
*G06F 3/06* (2006.01)

(52) U.S. Cl.
CPC ............ *G06F 3/0619* (2013.01); *G06F 3/064* (2013.01); *G06F 3/0652* (2013.01);
(Continued)

(58) Field of Classification Search
CPC ...... G06F 3/064; G06F 3/0679; G06F 3/0688; G06F 3/0655; G06F 3/061; G06F 3/0659;
(Continued)

(56) References Cited

U.S. PATENT DOCUMENTS

| | | | |
|---|---|---|---|
| 2009/0192963 A1* | 7/2009 | Sankaranarayanan ... | G06N 5/04 706/46 |
| 2010/0217920 A1 | 8/2010 | Song | |

(Continued)

FOREIGN PATENT DOCUMENTS

| | | |
|---|---|---|
| CN | 101727989 A | 6/2010 |
| CN | 104733046 A | 6/2015 |

(Continued)

OTHER PUBLICATIONS

Search report for International Application No. PCT/CN2021/073471 dated May 11, 2021.

(Continued)

*Primary Examiner* — Curtis James Kortman
(74) *Attorney, Agent, or Firm* — Dennemeyer & Associates LLC; Victoria Friedman

(57) ABSTRACT

A method, apparatus, and device for erasing a Solid State Disk (SSD), and a storage medium are provided. The method includes: receiving, from a Virtual Flash Translation Layer (VFTL) running in a preset virtual environment, an erasing request for erasing a target block; selecting a target spare block from preset spare blocks and feeding back the target spare block to the VFTL; collecting running information of the VFTL within a preset period of time, and determining whether a function of the VFTL is normal according to the running information; and in a case of determining that the function of the VFTL is normal, performing an erasing operation on the target block. The method may fully and comprehensively detect the abnormal (Continued)

condition of the VFTL, and may guarantee the integrity of data information in the solid state disk, thereby improving the reliability of the solid state disk.

17 Claims, 1 Drawing Sheet

(52) U.S. Cl.
CPC .......... *G06F 3/0659* (2013.01); *G06F 3/0679* (2013.01); *G06F 2212/1032* (2013.01)

(58) Field of Classification Search
CPC .... G06F 3/0653; G06F 3/0652; G06F 3/0614; G06F 3/0622; G06F 12/0246; G06F 2009/45579; G06F 2009/45583; G06F 2009/45558; G06F 2009/45587; G06F 2009/45591; G06F 2009/45537; G06F 2009/45541; G06F 2009/45545; G06F 2009/45554; G06F 2009/4555; G06F 2212/7201; G06F 2212/7025; G06F 2212/1032; G06F 2212/222; G06F 9/45558; G06F 11/261; G06F 2201/815; G06F 3/0619; G06F 3/0644
See application file for complete search history.

(56) References Cited

U.S. PATENT DOCUMENTS

| 2014/0250338 A1* | 9/2014 | Prabhakaran ....... G06F 11/0745 714/56 |
| 2017/0242722 A1* | 8/2017 | Qiu ..................... G06F 9/45558 |
| 2020/0225875 A1* | 7/2020 | Oh ........................ G06F 3/0622 |

FOREIGN PATENT DOCUMENTS

| CN | 105786633 A | 7/2016 |
| CN | 107451040 A | 12/2017 |
| CN | 107632914 A | 1/2018 |
| CN | 109445691 A | 3/2019 |
| CN | 111736780 A | 10/2020 |

OTHER PUBLICATIONS

Search report for Chinese application No. 202010785946.9 filed on Aug. 7, 2020.

* cited by examiner

METHOD, APPARATUS, AND DEVICE FOR ERASING SOLID STATE DISK, AND STORAGE MEDIUM

CROSS-REFERENCE TO RELATED APPLICATIONS

This is a 35 U.S.C. 371 National Stage Patent Application of International Application No. PCT/CN2021/073471, filed Jan. 25, 2021, which claims priority to Chinese application 202010785946.9, filed Aug. 7, 2020, each of which is hereby incorporated by reference in its entirety.

The present disclosure claims priority to Chinese Patent Application No. 202010785946.9, filed on Aug. 7, 2020 and entitled "Method, Apparatus, and Device for Erasing Solid State Disk, and Storage Medium", the disclosure of which is hereby incorporated by reference in its entirety.

TECHNICAL FIELD

The present disclosure relates to the technical field of Solid State Disk (SSD), and in particular to a method, apparatus, and device for erasing a solid state disk, and a computer-readable storage medium.

BACKGROUND

A solid state disk is a device configured to store user data, and is composed of modules such as a control unit and an NAND storage medium. Embedded software Firmware runs in the control unit to perform operations such as controlling resources, storing and scheduling user data, and maintaining an NAND device. A core processing module configured in Firmware for handling user reading, writing and erasing requests is a Flash Translation Layer (FTL), and a module configured in Firmware for monitoring and managing the FTL is a manager. Generally, when the FTL needs to erase a target block in the NAND, an erasing operation is directly performed on the target block through the FTL. However, if the function of the FTL is abnormal when the erasing operation is performed on the target block, data information will be lost.

In the related art, whether the FTL is normal is generally determined by detecting the performance of each module of the solid state disk, and the erasing operation is performed only when it is determined that each module is normal. However, abnormality of the FTL may be a result of integral running of a plurality of modules, in other words, when it is separately detected that the performance of each module is normal, the function of the FTL may still be abnormal under the integral running of the plurality of modules. Thus, the methods in the related art do not fully and completely detect the abnormal condition of the FTL. In another related art, the erasing operation is monitored when the FTL performs the erasing operation, so as to determine whether the FTL is normal. In this method, even if the FTL is detected to be abnormal, the erasing operation has been completed, and the erroneous erasing operation will still result in the loss of data information, so that the reliability of the solid state disk is low.

Therefore, how to guarantee the reliability of the solid state disk when performing the erasing operation on the solid state disk is a technical problem to be solved by those having ordinary skill in the art.

SUMMARY

In view of the above, a method for erasing a solid state disk is provided, which may guarantee the reliability of the solid state disk when performing an erasing operation on the solid state disk. An apparatus and device for erasing a solid state disk, and a computer-readable storage medium are also provided, which all have the same beneficial effects.

In order to address the above technical problem, a method for erasing a solid state disk is provided, which may include the following operations.

An erasing request for erasing a target block is received from a Virtual Flash Translation Layer (VFTL) running in a preset virtual environment.

A target spare block is selected from preset spare blocks and the target spare block is fed back to the VFTL.

Running information of the VFTL within a preset period of time is collected, and whether a function of the VFTL is normal is determined according to the running information.

In a case of determining that the function of the VFTL is normal, an erasing operation is performed on the target block.

In some exemplary implementations, the operation of collecting the running information of the VFTL within the preset period of time, and determining whether the function of the VFTL is normal according to the running information may include the following operations.

The running information of the VFTL within the preset period of time is collected, and whether the function of the VFTL is normal is determined by determining whether an erasing behavior and a writing behavior of the VFTL satisfy a first preset behavior standard, and/or by determining whether a proportion of reading, writing and erasing requests of the VFTL is within a preset proportion range, and/or by determining whether a behavior of the VFTL is consistent with a user request, and/or by determining whether running performance of the VFTL reaches a preset performance index, and/or by determining the behavior of the VFTL is consistent with preset behavior requirements, and/or by determining whether a running state of the solid state disk is within a standard state range, and/or by determining whether range check data submitted by the VFTL is normal, and/or by determining whether a memory area accessed by the VFTL is within a preset area range, and/or by determining whether a memory access behavior of the VFTL satisfies a second preset behavior standard.

In some exemplary implementations, the method may further include the following operation.

A determination condition for determining whether the function of the VFTL is normal is adjusted according to a delivery time of the solid state disk.

In some exemplary implementations, the operation of collecting the running information of the VFTL within the preset period of time, and determining whether the function of the VFTL is normal according to the running information may include the following operation.

The running information of the VFTL within the preset period of time is collected, and whether the function of the VFTL is normal is determined using a preset learning algorithm in combination with a plurality of pieces of running information.

In some exemplary implementations, the preset learning algorithm is a linear discriminant or a decision tree or a support vector machine.

In some exemplary implementations, before selecting the target spare block from the preset spare blocks and feeding back the target spare block to the VFTL, the method may further include the following operation.

Security of the erasing request is verified, and in a case where the verification is passed, the operation of selecting the target spare block from preset spare blocks and feeding back the target spare block to the VFTL is executed.

In some exemplary implementations, after collecting the running information of the VFTL within the preset period of time, and determining whether the function of the VFTL is normal according to the running information, the method may further include the following operation in a case of determining that the function of the VFTL is not normal.

The solid state disk is locked and/or an abnormal condition of the function of the VFTL is recorded.

In order to address the above technical problem, an apparatus for erasing a solid state disk is provided, which may include: a receiving module, a feedback module, a determination module, and an erasing module.

The receiving module may be configured to receive, from a VFTL running in a preset virtual environment, an erasing request for erasing a target block.

The feedback module may be configured to select a target spare block from preset spare blocks and feed back the target spare block to the VFTL.

The determination module may be configured to collect running information of the VFTL within a preset period of time, determine whether a function of the VFTL is normal according to the running information, and invoke the erasing module in a case of determining that the function of the VFTL is normal.

The erasing module may be configured to perform an erasing operation on the target block.

In order to address the above technical problem, a device for erasing a solid state disk is provided, which may include: a memory and a processor.

The memory may be configured to store a computer program.

The processor may be configured to implement the operations of any of the above methods for erasing the solid state disk when executing the computer program.

In order to address the above technical problem, a computer-readable storage medium, on which a computer program is stored, is provided. When executed by a processor, the computer program causes the processor to implement the operations of any of the above methods for erasing the solid state disk.

According to the provided method for erasing the solid state disk, after receiving the erasing request for erasing the target block from the VFTL running in the preset virtual environment, the erasing operation is not directly performed on the target block, but the target spare block is selected from the preset spare blocks and the target spare block is fed back to the VFTL. Then, by collecting the running information of the VFTL within the preset period of time, the erasing operation is performed on the target block only when it is determined that the function of the VFTL within the preset period of time is normal according to the running information of the VFTL within the preset period of time. It can be seen that the method determines whether the function of the VFTL is normal according to the running information of the VFTL within the preset period of time, and the running information is a reflection of an overall operation result of a plurality of modules in the solid state disk, so that the abnormal condition of the VFTL may be completely and comprehensively detected. Furthermore, even though it is determined that the function of the VFTL is abnormal, since the VFTL is an FTL running in the preset virtual environment, namely, no substantial operation is performed on the solid state disk, the integrity of data information in the solid state disk may be relatively guaranteed, thereby improving the reliability of the solid state disk when performing the erasing operation on the solid state disk.

In order to solve the above technical problem, an apparatus and device for erasing a solid state disk, and a computer-readable storage medium are also provided, which all have the same beneficial effects.

BRIEF DESCRIPTION OF THE DRAWINGS

In order to more clearly illustrate the embodiments of the present disclosure or the technical solutions in the related art, the drawings used in the description of the embodiments or the related art will be briefly described below. It is apparent that the drawings described below are only some embodiments of the present disclosure. Other drawings may further be obtained by those having ordinary skill in the art according to these drawings without creative efforts.

DETAILED DESCRIPTION

The technical solutions in the embodiments of the present disclosure will be clearly and completely described in conjunction with the drawings in the embodiments of the present disclosure. It is apparent that the described embodiments are only a part of the embodiments of the present disclosure, and not all of the embodiments of the present disclosure. All other embodiments obtained by those having ordinary skill in the art based on the embodiments of the present disclosure without creative efforts are within the scope of the present disclosure.

The embodiments of the present disclosure provide a method for erasing a solid state disk, which may guarantee the reliability of the solid state disk when performing an erasing operation on the solid state disk. The embodiments of the present disclosure also provide an apparatus and device for erasing a solid state disk, and a computer-readable storage medium, which all have the same beneficial effects.

In order to make the solutions of the embodiments of the present disclosure understood by those having ordinary skill in the art, the embodiments of the present disclosure will be described below in detail in combination with the drawings and the exemplary implementations.

Figure 1:
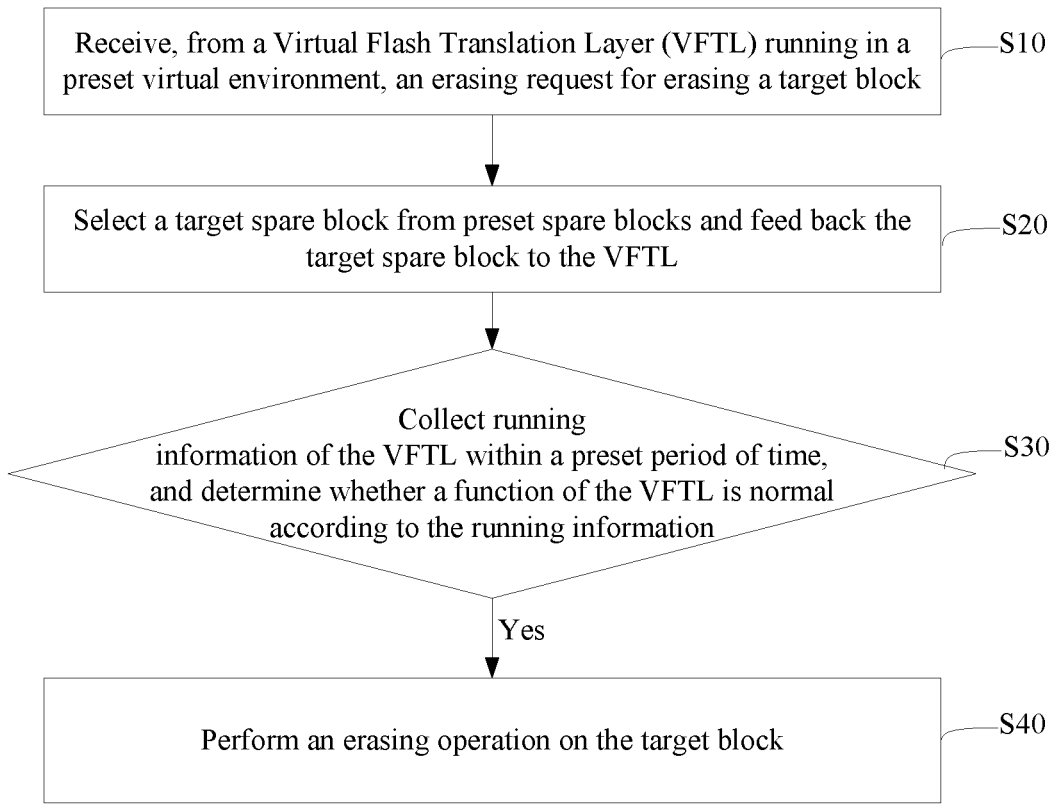
FIG. 1 is a flow diagram of a method for erasing a solid state disk provided by the embodiments of the present disclosure.

FIG. 1 is a flow diagram of a method for erasing a solid state disk provided by the embodiments of the present disclosure. As shown in FIG. 1, the method for erasing the solid state disk includes the following operations.

At S10, an erasing request for erasing a target block is received from a VFTL running in a preset virtual environment.

At S20, a target spare block is selected from preset spare blocks and the target spare block is fed back to the VFTL.

At S30, running information of the VFTL within a preset period of time is collected, and whether a function of the VFTL is normal is determined according to the running information.

At S40, in a case of determining that the function of the VFTL is normal, an erasing operation is performed on the target block.

In some exemplary implementations of the embodiment, firstly, an FTL in firmware is set to run in the preset virtual environment, no limitations are made to the specific type of the preset virtual environment in the embodiments, and the preset virtual environment may be set according to actual requirements. It may be understood that the VFTL is implemented by running the FTL in the preset virtual environment. The VFTL performs normal FTL operations in the preset virtual environment, including but not limited to: accepting a reading/writing/management request of a user, managing resources of an NAND, controlling power consumption performance, and performing optimal management on storage persistence of the NAND, etc. The VFTL may call a series of system interfaces, including a call interface with a read-write controller at a user side, a hardware accelerator interface for performance acceleration, reading, writing and erasing interfaces managed by the NAND, etc. It may be understood that since the VFTL is the FTL running in the preset virtual environment, namely, writing and erasing operations performed by the VFTL are virtual writing and erasing operations, rather than writing and erasing operations performed by directly manipulating hardware. The virtual writing and erasing operations are performed by making a request to a manager so that the manager performs corresponding writing and erasing operations. Correspondingly, the manager running outside the preset virtual environment is responsible for interpreting and implementing the erasing request of the VFTL. The manager is also responsible for monitoring whether the behavior of the VFTL is normal, namely, determining whether the function of the VFTL is normal.

In some exemplary implementations, the manager presets and maintains a group of spare blocks, and when the manager receives the erasing request for erasing the target block from the VFTL running in the preset virtual environment, the manager first selects a target spare block from the preset spare block, namely, feeds back a block already erased to the VFTL, so that the VFTL may continue to provide a service in responsive to a user request. Then, the manager determines whether the function of the VFTL is normal according to the running information after collecting the running information of the VFTL within the preset time period.

It is to be noted that the target block that the VFTL requests to erase is temporarily stored in a management list of the manager, and is not immediately erased. After the manager confirms that the behavior of the VFTL is normal within the preset period of time, the erasing operation is performed on the target block. The erased target block becomes a spare block, and the manager manages the spare block for recycling.

According to the method for erasing the solid state disk provided by the embodiments of the present disclosure, after receiving the erasing request for erasing the target block from the VFTL running in the preset virtual environment, the erasing operation is not directly performed on the target block, but the target spare block is selected from the preset spare blocks and the target spare block is fed back to the VFTL. Then, by collecting the running information of the VFTL within the preset period of time, the erasing operation is performed on the target block only when it is determined that the function of the VFTL within the preset period of time is normal according to the running information of the VFTL within the preset period of time. It can be seen that the method determines whether the function of the VFTL is normal according to the running information of the VFTL within the preset period of time, and the running information is a reflection of an overall operation result of a plurality of modules in the solid state disk, so that an abnormal situation of the VFTL may be completely and comprehensively detected. Furthermore, even though it is determined that the function of the VFTL is abnormal, since the VFTL is an FTL running in the preset virtual environment, namely, no substantial operation is performed on the solid state disk, the integrity of data information in the solid state disk may be relatively guaranteed, thereby improving the reliability of the solid state disk when performing the erasing operation on the solid state disk.

On the basis of the above embodiment, the embodiment further describes and optimizes the technical solution. In some exemplary implementations of the embodiment, the operation of collecting the running information of the VFTL within the preset period of time, and determining whether the function of the VFTL is normal according to the running information includes the following operation.

The running information of the VFTL within the preset period of time is collected, and whether the function of the VFTL is normal is determined by determining whether an erasing behavior and a writing behavior of the VFTL satisfy a first preset behavior standard, and/or by determining whether a proportion of reading, writing and erasing requests of the VFTL is within a preset proportion range, and/or by determining whether a behavior of the VFTL is consistent with a user request, and/or by determining whether running performance of the VFTL reaches a preset performance index, and/or by determining the behavior of the VFTL is consistent with preset behavior requirements, and/or by determining whether a running state of the solid state disk is within a standard state range, and/or by determining whether range check data submitted by the VFTL is normal, and/or by determining whether a memory area accessed by the VFTL is within a preset area range, and/or by determining whether a memory access behavior of the VFTL satisfies a second preset behavior standard.

In the embodiments, by collecting the running information of the VFTL within the preset period of time, whether the function of the VFTL is normal is determined according to the running information within the preset period of time.

The erasing and writing behaviors of the VFTL should be regular, so that in the embodiments, determining whether the erasing and writing behaviors of the VFTL satisfy a first preset behavior standard is one of the determination conditions for determining whether the function of the VFTL is normal. For example, whether the function of the VFTL is normal is determined by determining whether a writing range of the VFTL, a writing frequency of the VFTL, an erasing frequency of the VFTL and distribution of erasing between each physical NAND unit satisfy the preset first preset behavior standard, such as whether the writing frequency is within a preset specified writing frequency range, whether the erasing frequency is within a preset specified erasing frequency range, etc.

The proportion of the reading, writing and erasing requests of the VFTL should be within a certain reasonable range of values, so that in the embodiments, determining whether the proportion of the reading, writing and erasing requests of the VFTL is within the preset proportion range is used as one of the determination conditions for determining whether the function of the VFTL is normal. It may be understood that although different user behaviors may vary, the statistical distribution of the reading, writing and erasing requests for each user within a certain time should be reasonable.

The behavior of the VFTL should be consistent with the reading/writing/management request of the user, so that in the embodiments, determining whether the VFTL behavior is consistent with the user request is one of the determination conditions for determining whether the function of the VFTL is normal. For example, when the data information corresponding to an address that the user request requires to read is inconsistent with the data information corresponding to an address read when the VFTL performs a read operation, it indicates that the function of the VFTL is abnormal.

The performance index of the VFTL shall be kept within the range expected by design. For example, the write delay to the user may be within d microseconds according to the designed index, and if the time frequently exceeds exception by excessive amplitude, there is a certain small probability that the function of the VFTL is abnormal, so that in the embodiments, determining whether the running performance of the VFTL reaches the preset performance index is used as one of the determination conditions for determining whether the function of the VFTL is normal.

The behavior and design intents of the VFTL should be consistent, so that in the embodiments, determining whether the behavior of the VFTL is consistent with the preset behavior requirement may be used as one of the determination conditions for determining whether the function of the VFTL is normal. For example, a Wearleveling algorithm is often included in programming of the VFTL, so that the erasing frequency of the block should be related to PE count of the block, and the behavior of the VFTL should reflect this correlation.

The overall running state of the disk should be within the object of the programming, so that in the embodiments, whether the function of the VFTL is normal may be determined by determining whether the running state of the solid state disk is within the standard state range. For example, if the designed use temperature of the solid state disk is below N degrees centigrade, and if the temperature is above N degrees centigrade for a long time, and Firmware still works, there is a certain small possibility that the function of VFTL is abnormal.

The VFTL should actively submit the range check data at runtime to the manager, so that in the embodiments, whether the function of the VFTL is normal may be determined by determining whether the range check data submitted by the VFTL is normal. For example, each module of the VFTL avoids error propagation and amplification by collecting a series of function input incentives at runtime and checking whether the function input incentives are reasonable values.

The memory area accessed by the VFTL should be within the reasonable range of values. In some configurations with higher security requirements, access to the memory data may also be incorporated into a virtual function, so that the manager may monitor whether the memory access address of the VFTL is reasonable. That is, in the embodiment, whether the function of the VFTL is normal may be determined by determining whether the memory area accessed by the VFTL is within the preset area range.

In some exemplary implementations, whether the function of the VFTL is normal may be determined by determining whether the memory access behavior of the VFTL satisfies the second preset behavior standard. The manager may perform virtualization on accesses to a group of memory values (not necessarily all memories to avoid performance degradation due to virtualization), and these accesses should be within the reasonable range. For example, the VFTL acquires the data information on the solid state disk through the manager, and the manager determines whether the function of the VFTL is normal according to whether a reading frequency, a reading range, a time interval for reading data information, etc. of the data information acquired by the VFTL are within the range of the second preset behavior standard, or whether the value of the read data information is greater than 0, etc.

As an exemplary implementation, the operation of collecting the running information of the VFTL within the preset period of time, and determining whether the function of the VFTL is normal according to the running information may include the following operation.

The running information of the VFTL within the preset period of time is collected, and whether the function of the VFTL is normal is determined using a preset learning algorithm in combination with a plurality of pieces of running information.

In some exemplary implementations of the embodiments, by setting the preset learning algorithm, the running information is input into the preset learning algorithm, and whether the function of the VFTL is normal is determined through calculation. In some exemplary implementations, the plurality of pieces of running information in the embodiment includes an operation value such as a writing frequency and a writing range, and a determination result determined according to the running information such as a determination result of whether the writing frequency of the running information is within a preset standard writing frequency range, and no limitations are made thereto in the embodiments.

It is to be noted that, in the embodiments, the manager may determine the reasonable range of the determination condition according to the learning algorithm. In some exemplary implementations, it may be a reasonable range of certain rules to directly receive input from a software developer, such as the values of N and K in "the time the temperature exceeds N degrees centigrade should be less than K" may be directly defined and input by the software developer. Alternatively, the manager may collect and count the reasonable range. In some exemplary implementations, when the solid state disk just leaves the factory, a bug covered without verification is less likely to appear in the firmware, so that the running information of the solid state disk within the preset delivery time may be collected as a learning sample of the standard range of the running information, and the reasonable range of the rules is counted. In the actual operation, the running information of the VFTL may be gradually collected and learned according to the actual operation experience, and the learning sample as the standard range of the running information is determined.

As an exemplary implementation, the preset learning algorithm is a linear discriminant or a decision tree or a support vector machine.

In some exemplary implementations of the embodiment, the preset learning algorithm may be a linear discrimination or a decision tree or a support vector machine, but may also be other preset learning algorithms, which may be selected according to actual requirements, and no specific limitations are made thereto in the embodiments.

It can be seen that the embodiments perform comprehensive determination on the plurality of pieces of running information using the preset learning algorithm, which may make the determination result of determining whether the function of the VFTL is normal more accurate.

The embodiment further describes and optimizes the technical solution on the basis of the above embodiments, and in some exemplary implementations, the embodiment further includes the following operation.

A determination condition for determining whether the function of the VFTL is normal is adjusted according to a delivery time of the solid state disk.

In some exemplary implementations of the embodiment, the delivery time of the solid state disk is further acquired, and the determination condition for determining whether the function of the VFTL is normal is adjusted according to the delivery time of the solid state disk. Generally, the longer the delivery time of the solid state disk, the stricter the determination condition for determining whether the function of the VFTL is normal. The strictness of the determination condition may be controlled by setting more stringent standard data information for comparison with the running information. For example, for a solid state disk A that has been left from the factory for one year, the determination condition may be that "the time the temperature exceeds N degrees centigrade should be less than K1", and for a solid state disk B that has been left from the factory for five years, the determination condition may be that "the time the temperature exceeds N degrees centigrade should be less than K2", herein, K1>K2, namely, the longer the delivery time, the stricter the determination condition.

The embodiment may make the determination result of determining whether the function of the VFTL is normal more accurate by further adjusting the determination condition of determining whether the function of the VFTL is normal according to the delivery time of the solid state disk.

The embodiment further describes and optimizes the technical solution on the basis of the above embodiment, and in some exemplary implementations, before selecting the target spare block from the preset spare blocks and feeding back the target spare block to the VFTL, the method further includes the following operation.

Security of the erasing request is verified, and in a case where the verification is passed, the operation of selecting the target spare block from preset spare blocks and feeding back the target spare block to the VFTL is executed.

In some exemplary implementations of the embodiment, before the manager feeds back the erasing request transmitted by the VFTL, security verification is further performed on the erasing request. In some exemplary implementations, the security verification includes determining whether the erasing request is legal, carries a virus or is an erasing request transmitted by the corresponding VFTL, etc. Specific verification methods may be digital certificate verification, hash value verification, etc. and no specific limitations are made thereto in the embodiments.

In some exemplary implementations, if the security verification of the erasing request is passed, the operation of selecting the target spare block from preset spare blocks and feeding back the target spare block to the VFTL is executed. If the verification fails, it indicates that the erasing request is abnormal, the erasing request may be ignored or a corresponding alarm message may be sent according to the erasing request, so as to prompt the user that the current erasing request is abnormal.

It can be seen that the embodiment further performs security verification on the erasing request before feeding back the erasing request, so that the security of the erasing request may be further guaranteed, thereby guaranteeing the security of the data information of the solid state disk.

On the basis of the above embodiment, the embodiment further describes and optimizes the technical solution. In some exemplary implementations, after collecting the running information of the VFTL within the preset period of time, and determining whether the function of the VFTL is normal according to the running information, in a case of determining that the function of the VFTL is not normal, the method may further include the following operation.

The solid state disk is locked and/or an abnormal condition of the function of the VFTL is recorded.

In some exemplary implementations of the embodiment, corresponding measures are further taken when it is determined that the function of the VFTL is abnormal. In some exemplary implementations, in the actual operation, corresponding prompt information may be sent out according to the abnormal condition of the function of the VFTL. In some exemplary implementations, after determining the determination result, a preset prompt device is triggered to send out the corresponding prompt information. In addition, in the embodiments, in a case where it is determined that the function of the VFTL is abnormal, the solid state disk is locked, so that the solid state disk may only perform a read operation and may not perform a write operation or an erasing operation, thereby relatively guaranteeing the security of the data information in the solid state disk. It is to be noted that, in the embodiments, the abnormal condition of the function of the VFTL may also be recorded, the specific recording method may be recorded in the form of text or table, and no limitations are made thereto in the embodiments. Setting may be performed according to actual requirements, and no limitations are made thereto in the embodiments. In some exemplary implementations, the abnormal condition of the VFTL may be recorded in storage devices such as a memory bank, a hard disk, a Trans-flash Card (TF) and a Secure Digital Memory Card (SD), selection is made according to actual requirements, and no limitations are made thereto in the embodiments.

It can be seen that, the embodiment further takes corresponding measures in a case where it is determined that the function of the VFTL is abnormal, so that the security of the solid state disk may be relatively guaranteed, and viewing and analysis of the abnormal condition of the VFTL are facilitated, thereby further improving the user experience.

The embodiments of the method for erasing the solid state disk provided by the present disclosure are described above in detail, and the embodiments of the present disclosure also provide an apparatus and device for erasing the solid state disk, and a computer-readable storage medium corresponding to the method. Since the embodiments of the apparatus, the device and the computer-readable storage medium correspond to the embodiments of the method for erasing the solid state disk, the embodiments of the apparatus, the device and the computer-readable storage medium may be referred to the description of the embodiments of the method for erasing the solid state disk, and will not be repeated here.

Figure 2:
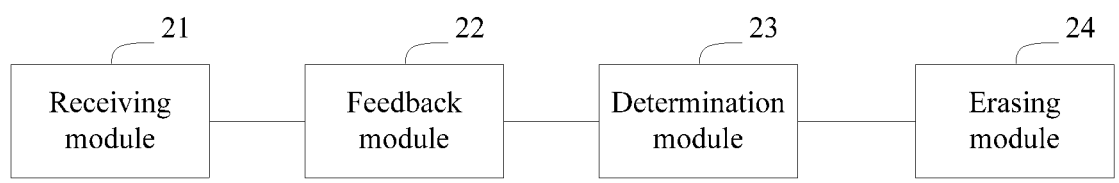
FIG. 2 is a structural diagram of an apparatus for erasing a solid state disk provided by the embodiments of the present disclosure.

FIG. 2 is a structural diagram of an apparatus for erasing a solid state disk provided by the embodiments of the present disclosure, as shown in FIG. 2, the apparatus for erasing the solid state disk includes: a receiving module 21, a feedback module 22, a determination module 23, and an erasing module 24.

The receiving module 21 is configured to receive, from a VFTL running in a preset virtual environment, an erasing request for erasing a target block.

The feedback module 22 is configured to select a target spare block from preset spare blocks and feed back the target spare block to the VFTL.

The determination module 23 is configured to collect running information of the VFTL within a preset period of time, determine whether a function of the VFTL is normal according to the running information, and invoke the erasing module 24 in a case of determining that the function of the VFTL is normal.

The erasing module 24 is configured to perform an erasing operation on the target block.

The apparatus for erasing the solid state disk provided by the embodiments of the present disclosure has the beneficial effects of the above method for erasing the solid state disk.

As an exemplary implementation, the apparatus for erasing the solid state disk may further include an adjustment module.

The adjustment module is configured to adjust a determination condition for determining whether the function of the VFTL is normal according to a delivery time of the solid state disk.

As an exemplary implementation, the apparatus for erasing the solid state disk may further include a verification module.

The verification module is configured to verify security of the erasing request, and in a case where the verification is passed, invoke the feedback module 22.

As an exemplary implementation, the apparatus for erasing the solid state disk may further include an execution module.

The execution module is configured to lock the solid state disk and/or record an abnormal condition of the function of the VFTL after collecting the running information of the VFTL within the preset period of time, and determining that the function of the VFTL is abnormal according to the running information.

Figure 3:
FIG. 3 is a structural diagram of a device for erasing a solid state disk provided by the embodiments of the present disclosure.

FIG. 3 is a structural diagram of a device for erasing a solid state disk provided by the embodiments of the present disclosure, as shown in FIG. 3, the device for erasing the solid state disk includes: a memory 31 and a processor 32.

The memory 31 is configured to store a computer program.

The processor 32 is configured to implement the operations of the above method for erasing the solid state disk when executing the computer program.

The device for erasing the solid state disk provided by the embodiments of the present disclosure has the beneficial effects of the above method for erasing the solid state disk.

In order to solve the above technical problem, the present disclosure also provides a computer-readable storage medium, on which a computer program is stored. When executed by a processor, the computer program causes the processor to implement the operations of the above method for erasing the solid state disk.

The computer-readable storage medium provided by the embodiments of the present disclosure has the beneficial effects of the above method for erasing the solid state disk.

The method, apparatus and device for erasing the solid state disk, and the computer-readable storage medium provided by the embodiments of the present disclosure are described above in detail, the principles and implementations of the present disclosure are described herein using exemplary embodiments, the foregoing description of the embodiments are only used to help the understanding of the method and core concept of the present disclosure. It is to be noted that a number of variations and modifications may be made by those having ordinary skill in the art without departing from the conception of the present disclosure, and all fall within the scope of protection of the present disclosure.

The various embodiments in the present specification are described in a progressive manner, and each embodiment focuses on differences from other embodiments, and the same similar parts between the various embodiments can be referred to each other. For the apparatus disclosed in the embodiments, since the apparatus corresponds to the method disclosed in the embodiments, the description is relatively simple, and the relevant parts can be referred to the method part.

Those having ordinary skill in the art may realize that the units and algorithm operations of each example described in combination with the embodiments disclosed in the present disclosure may be implemented by electronic hardware, computer hardware or a combination of computer software and the electronic hardware. In order to clearly illustrate the interchangeability of hardware and software, the composition and operations of each example have been described in general terms of function in the above description. Whether these functions are executed in a hardware or software manner depends on specific applications and design constraints of the technical solutions. Professionals may realize the described functions for each specific application by use of different methods, but such realization shall fall within the scope of the present disclosure.

What is claimed is:

1. A method for erasing a Solid State Disk (SSD), wherein the SSD comprises a controller and a NAND storage medium, the controller comprises firmware, and a Flash Translation Layer (FTL) and a manager are configured in the firmware, the method comprising:
   running the FTL in a preset virtual environment to implement a Virtual Flash Translation Layer (VFTL), wherein the VFTL is configured to perform operations of the FTL in the preset virtual environment, and performs virtual writing and erasing operations without directly manipulating hardware;
   receiving, from the VFTL and by the manager, which is running outside the preset virtual environment, an erasing request for erasing a target block stored in the NAND storage medium;
   selecting, by the manager, a target spare block from preset spare blocks and feeding back, by the manager, the target spare block to the VFTL as a block already erased, so that the VFTL continues to provide a service in response to a user request;
   collecting, by the manager, running information of the VFTL within a preset period of time, and determining, by the manager, whether a function of the VFTL is normal according to the running information; and
   in response to determining that the function of the VFTL is normal, performing, by the manager, an erasing operation on the target block stored in the NAND storage medium;
   wherein before selecting, by the manager, the target spare block from the preset spare blocks and feeding back, by the manager, the target spare block to the VFTL as the block already erased, the method further comprises:
   verifying, by the manager, security of the erasing request, and in response to determining the verification has passed, executing, by the manager, the operation of selecting the target spare block from preset spare blocks and feeding back the target spare block to the VFTL as the block already erased.

2. The method according to claim 1, wherein the operation of collecting, by the manager, the running information of the VFTL within the preset period of time, and determining, by the manager, whether the function of the VFTL is normal according to the running information comprises:
   collecting, by the manager, the running information of the VFTL within the preset period of time, and determining, by the manager, whether the function of the VFTL is normal by determining whether an erasing behavior and a writing behavior of the VFTL satisfy a first preset behavior standard, and/or by determining whether a proportion of reading, writing and erasing requests of the VFTL is within a preset proportion range, and/or by determining whether a behavior of the VFTL is consistent with a user request, and/or by determining whether running performance of the VFTL reaches a preset performance index, and/or by determining the behavior of the VFTL is consistent with preset behavior requirements, and/or by determining whether a running state of the solid state disk is within a standard state range, and/or by determining whether range check data submitted by the VFTL is normal, and/or by determining whether a memory area accessed by the VFTL is within a preset area range, and/or by determining whether a memory access behavior of the VFTL satisfies a second preset behavior standard.

3. The method according to claim 2, further comprising: adjusting a determination condition for determining whether the function of the VFTL is normal according to a delivery time of the solid state disk.

4. The method according to claim 3, wherein the longer the delivery time, the stricter the determination condition.

5. The method according to claim 2, wherein the operation of collecting, by the manager, the running information of the VFTL within the preset period of time, and determining, by the manager, whether the function of the VFTL is normal according to the running information comprises:
  collecting, by the manager, the running information of the VFTL within the preset period of time, and determining, by the manager, whether the function of the VFTL is normal using a preset learning algorithm in combination with a plurality of pieces of running information.

6. The method according to claim 5, wherein the preset learning algorithm is a linear discriminant or a decision tree or a support vector machine.

7. The method according to claim 5, wherein the plurality of pieces of running information comprises: a writing frequency and a writing range, and a determination result of whether the writing frequency of the running information is within a preset standard writing frequency range.

8. The method according to claim 2, wherein determining whether the erasing behavior and the writing behavior of the VFTL satisfy the first preset behavior standard comprises:
  determining whether a writing range of the VFTL, a writing frequency of the VFTL, an erasing frequency of the VFTL and distribution of erasing between each physical NAND unit satisfy the first preset behavior standard.

9. The method according to claim 2, wherein determining whether the function of the VFTL is normal by determining whether the behavior of the VFTL is consistent with the user request comprises:
  when data information corresponding to an address that the user request requires to read is inconsistent with data information corresponding to an address read when the VFTL performs a read operation, determining that the function of the VFTL is abnormal.

10. The method according to claim 2, wherein determining whether the function of the VFTL is normal by determining whether the memory access behavior of the VFTL satisfies the second preset behavior standard comprises:
  acquiring, by the VFTL, data information on the solid state disk through a manager, and determining, by the manager, whether the function of the VFTL is normal according to whether a reading frequency, a reading range, a time interval for reading data information of the data information acquired by the VFTL are within a range of the second preset behavior standard.

11. The method according to claim 1, wherein after collecting, by the manager, the running information of the VFTL within the preset period of time, and determining, by the manager, whether the function of the VFTL is normal according to the running information, in a case of determining that the function of the VFTL is not normal, the method further comprises:
  locking the solid state disk and/or recording an abnormal condition of the function of the VFTL.

12. The method according to claim 1, wherein the target block that the VFTL requests to erase in the erasing request is temporarily stored in a management list of the manager before the erasing operation is performed on the target block.

13. The method according to claim 1, wherein the target spare block and the preset spare blocks are blocks already erased.

14. The method according to claim 1, wherein after performing the erasing operation on the target block, the target block becomes a preset spare block and is managed by the manager for recycling.

15. The method according to claim 1, wherein verifying security of the erasing request comprises: determining whether the erasing request is legal, carries a virus or is an erasing request transmitted by the corresponding VFTL.

16. A Solid State Disk (SSD) comprising a controller and a NAND storage medium, wherein the controller comprises firmware, and a Flash Translation Layer (FTL) and a manager are configured in the firmware, wherein
  the FTL is run in a preset virtual environment to implement a Virtual Flash Translation Layer (VFTL), wherein the VFTL is configured to perform operations of the FTL in the preset virtual environment, and performs virtual writing and erasing operations without directly manipulating hardware;
  the manager is run outside the preset virtual environment and is configured to receive, from the VFTL, an erasing request for erasing a target block stored in the NAND storage medium;
  the manager is configured to select a target spare block from preset spare blocks and feed back the target spare block to the VFTL as a block already erased, so that the VFTL continues to provide a service in response to a user request;
  the manager is configured to collect running information of the VFTL within a preset period of time, and determine whether a function of the VFTL is normal according to the running information; and
  the manager is configured to, in a case of determining that the function of the VFTL is normal, perform an erasing operation on the target block stored in the NAND storage medium;
  the manager is configured to, before selecting the target spare block from the preset spare blocks and feeding back the target spare block to the VFTL as the block already erased, verify security of the erasing request, and in a case where the verification is passed, select the target spare block from preset spare blocks and feed back the target spare block to the VFTL as the block already erased.

17. A non-transitory computer-readable storage medium for erasing a Solid State Disk (SSD), wherein the SSD comprises a controller and a NAND storage medium, the controller comprises firmware, and a Flash Translation Layer (FTL) and a manager are configured in the firmware, wherein a computer program is stored on the computer-readable storage medium, and when executed by a processor, the computer program causes the processor to implement the following operations:

running the FTL in a preset virtual environment to implement a Virtual Flash Translation Layer (VFTL), wherein the VFTL is configured to perform operations of the FTL in the preset virtual environment, and performs virtual writing and erasing operations without directly manipulating hardware;

receiving, from the VFTL and by the manager, which is running outside the preset virtual environment, an erasing request for erasing a target block stored in the NAND storage medium;

selecting, by the manager, a target spare block from preset spare blocks and feeding back, by the manager, the target spare block to the VFTL as a block already erased, so that the VFTL continues to provide a service in response to a user request;

collecting, by the manager, running information of the VFTL within a preset period of time, and determining, by the manager, whether a function of the VFTL is normal according to the running information; and in a case of determining that the function of the VFTL is normal, performing, by the manager, an erasing operation on the target block stored in the NAND storage medium;

wherein the computer program further causes the processor to implement the following operations before selecting, by the manager, the target spare block from the preset spare blocks and feeding back, by the manager, the target spare block to the VFTL as the block already erased:

verifying, by the manager, security of the erasing request, and in a case where the verification is passed, executing, by the manager, the operation of selecting the target spare block from preset spare blocks and feeding back the target spare block to the VFTL as the block already erased.

\* \* \* \* \*